United States Patent [19]

Fukuda et al.

[11] 3,732,795

[45] May 15, 1973

[54] ELECTRIC CELL CASE FOR USE IN CAMERA

[75] Inventors: Susumu Fukuda; Takehiko Kakei, both of Hyogo, Japan

[73] Assignee: Fuji Photo Film Co., Ltd., Minami Ashigara-shi, Kanagawa, Japan

[22] Filed: Oct. 22, 1970

[21] Appl. No.: 83,048

[30] Foreign Application Priority Data

Oct. 22, 1969 Japan ..............................44/100534

[52] U.S. Cl. ................................95/11 R, 95/31 EL

[51] Int. Cl. ............................................G03b 19/02

[58] Field of Search ..........................95/11 R, 31 EL

[56] References Cited

UNITED STATES PATENTS 3,524,393 8/1970 Greger..........................95/31 EL X 3,537,909 11/1970 Horton..........................95/31 EL X

*Primary Examiner*—Samuel S. Matthews

*Assistant Examiner*—Kenneth C. Hutchison

*Attorney*—Sughrue, Rothwell, Mion, Zinn & Macpeak

[57] ABSTRACT

An electric cell case is used in a still camera having a slide case with a case body secured to one side of the camera body facing the slide case and a cover hinged to the case body. The cover is adapted to open and close within the slide case for quick replacement of cells, opening with a finger by releasing a snap latch, and is closed automatically by returning the slide case to a fit-in position relative to the camera body.

6 Claims, 2 Drawing Figures

INVENTORS
SUSUMU FUKUDA
TAKEHIKO KAKEI
BY Sughrue, Rothwell, Mion, Zinn & Macpeak
ATTORNEYS

ELECTRIC CELL CASE FOR USE IN CAMERA

BACKGROUND OF THE INVENTION

FIELD OF THE INVENTION

This invention relates to an electric cell case for use in a still camera, and particularly to a simple electric cell case for use in a camera of the type in which photography is achieved while the slide case is maintained in a pull-out position, and after completion of photography, the slide case is returned to the original position.

BRIEF DESCRIPTION OF THE DRAWING

The structure, operation and advantage of the cell case according to the invention will be described below with reference to the accompanying drawings in which.

DESCRIPTION OF THE PREFERRED EMBODIMENT

Figure 1:
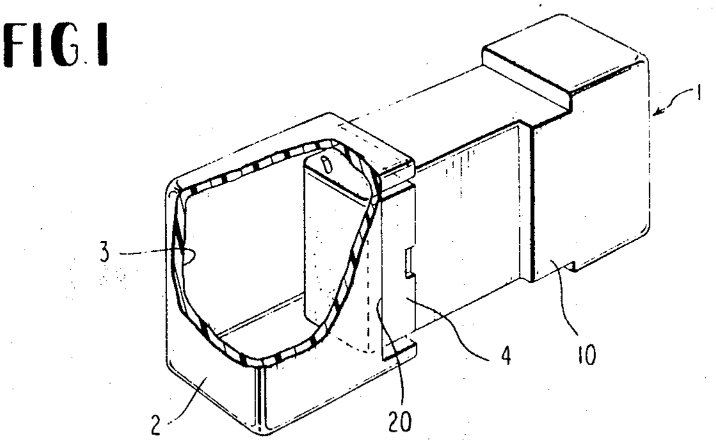
FIG. 1 is a perspective view of the cell case of the present invention shown together with a camera body.

Referring to FIG. 1, a camera body is shown at 1 with a slide case 2 provided so as to slide left and right thereon. The slide case 2 has a recess 20 on the front side in the drawing for the withdrawal of cells and the recess 20 is adapted to fit onto a projection 10 provided on the side of the camera body 1. A cell case 4 is secured to one end of the camera body 1.

Figure 2:
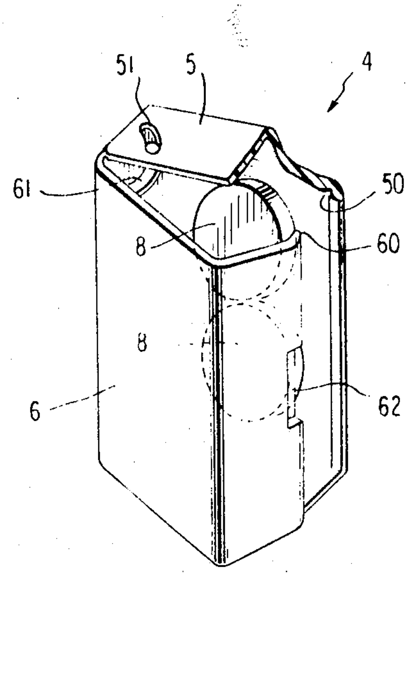
FIG. 2 is a partial perspective view of the cell case of the invention in opened condition.

As is illustrated in FIG. 2, the cell case 4 includes a case body 5 having an opening at the front and a cover 6 hinged thereto. The cover 6 has a snap latch 60 which will come into engagement with a groove 50 provided at the front edge portion of the case body 5. In the vicinity of the hinged part of the case 4, an arm 61 is fixed to the case cover 6 to prevent the cover from opening more than necessary. An arc-like groove 51 is provided on the case body 5 for engagement with the arm 61. The front portion of the case cover includes a hook part 62. The snap latch is released by engaging the hook part 62 with a finger and rotating the same. The body 5 of the electric cell case 4 is fixed to one side end of the camera body 1, and the cover 6 is adapted to open within the slide case 2 to a certain limited angle.

When it is desired to replace electric cells 8 contained in the cell case of the above-described construction, the slide case 2 of the camera is slid to the photograph taking position shown in FIG. 1, and the case cover 6 is opened by releasing the latch to the left with a finger engaging the hook part 62 of the case cover 6. The cells are then taken out of the case, new cells are placed in the case and thereafter the slide case 2 is slid again to the right until the cover of the cell case is closed automatically by contact with the inner wall 3 of the slide case 2.

The cover 6 is resiliently hinged to the case body 5. When the latch is released, the cover 6 is automatically opened by an angle at least sufficient for withdrawal of the cells 8. When the slide case 2 of the camera is closed, the cover 6 of the electric cell case 4 is closed by being pushed by the inner wall 3 of the slide case 2. Since, however, the cover 6 is held to the body 5 of the case by means of a resilient latch, the pull-out of the slide case 2 for the next photograph does not result in the opening of the cover of the cell case.

With such a simple structure as described above, the cell case of the present invention does not require the use of fingers in closing its cover. The closing of the cover can be automatically effected by returning the slide case to a fit-in position relative to the camera body. Accordingly, the replacement of cells can be made quickly and efficiently.

What is claimed is:

1. In a camera of the type including slide case means slidably mounted on a camera body for covering a substantial portion of said camera body when in a closed position and for exposing said camera body when in an open position, the improvement comprising a cell case including a case body secured to one side of said camera body, said one side facing the side of said slide case means, said case body having at least one open side; cover means, hinged to said case body, having a first position for covering said at least one open side of said case body and having a second position for exposing said at least one open side of said case body; and resilient latch means for holding said cover means in said first position.

2. The camera as claimed in claim 1, wherein said cover means includes a finger engaging hook part to allow release of said resilient latch means.

3. The camera as claimed in claim 1, wherein said slide case means includes an edge opening permitting access to said cell case and said camera body includes a projection received by said opening in slide case when said slide case is in said closed position.

4. The camera as claimed in claim 3, wherein said cover means includes a finger engaging hook part to allow release of said resilient latch means.

5. The camera as claimed in claim 4, wherein said resilient latch means comprises an edge projection on said cover means and an edge groove carried by said case body receiving the same.

6. The camera as claimed in claim 5, further comprising means limiting opening of said cover means to a predetermined angle.

* * * * *